March 20, 1962  C. W. BUCKLEY ETAL  3,026,150
AIR BEARINGS
Filed Aug. 15, 1960

Inventors
CHARLES W. BUCKLEY
SIGMUND RAPPAPORT
By
Borst and Borst Attorneys

3,026,150
AIR BEARINGS

Charles W. Buckley, Mount Vernon, and Sigmund Rappaport, Port Washington, N.Y., assignors to Sperry Rand Corporation, Ford Instrument Company Division, Wilmington, Del., a corporation of Delaware
Filed Aug. 15, 1960, Ser. No. 49,510
4 Claims. (Cl. 308—9)

This invention relates to bearings and more particularly to an improvement in air bearings and the method of making them.

Heretofore, a method of producing externally pressurized air bearings, where the air pressure is used as a means of supporting a rotative member which is housed in a stationary member, was by drilling small holes in a sleeve and end plates which housed the rotative member. The criterion for one application of this type of air bearing is that the angular relationship between the rotative member and the stationary member remains unchanged due to the means of support, namely the air pressure should not cause any torque.

The small holes which were drilled in the sleeve and end plates were covered with a sheet of aluminum foil and extremely small holes were pierced in the aluminum foil concentric with the drilled holes. These pierced holes acted as orifices to control the flow of air to the drilled holes.

In manufacturing bearings of the above character it has been found that the small drilled holes were often out of radial alignment with respect to the axis of the rotative member. This misalignment and the jet effect of air passing through a hole, which is axially long with respect to its diameter, caused an undesirable turbine torque upon the rotative member. It was also found that a faulty pierced hole in the aluminum foil contributed to the undesirable turbine torque by giving the air a directional jet effect.

Since there is no way to correct a faulty drilled hole the entire sleeve would have to be scrapped and a new one manufactured. A faulty pierced hole would necessitate the removal of the entire aluminum foil strip and replacing it with an unpierced aluminum foil strip and repiercing it. All of these operations greatly contributed to the high cost of manufacturing air bearings as well as to costly time consuming operations.

Therefore, it is an object of this invention to provide an air bearing wherein the directional property of the air stream has been eliminated.

Another object of this invention is to provide an air bearing which has a repairable sleeve.

A still further object of this invention is to provide an improved method in manufacturing air bearings.

A still further object of this invention is to provide an air bearing which minimizes turbine torque effect.

A still further object of this invention is to provide an air bearing which is inexpensive to manufacture and easily maintained.

To these ends the invention contemplates the use of a standard air bearing sleeve having end plates therefor. In the sleeve and end plates holes are drilled within which removable plugs are placed. The plugs have a main vertical air passage which ends in crossed air passages which are at right angles to each other and perpendicular to the main air passage. The end of the plug which contains the crossed air passages is slightly smaller than the rest of the plug thereby allowing the air coming out of the crossed passages to pass around the plug and find its way to the chamber within which the rotative member is supported, thereby eliminating the directional property of the air and also decreasing the air velocity and thus minimizing the turbine effect.

The main air passage of the removable plug is covered with an individual piece of aluminum foil. A hole is pierced in the aluminum foil substantially concentric with the main air passage of the plug. For the reasons pointed out above it is no longer necessary for the pierced hole to be exactly concentric with the main air passage of the plug.

Should it ever become necessary to change one of the air bearing holes only one of the plugs has to be changed instead of replacing an entire sleeve or end plate. The foiling and repiercing of the holes can also be done individually instead of replacing an entire aluminum strip.

The invention has other objects and advantages which will appear from the following description of a particular embodiment of the invention in conjunction with the accompanying drawing, in which.

Figure 1:
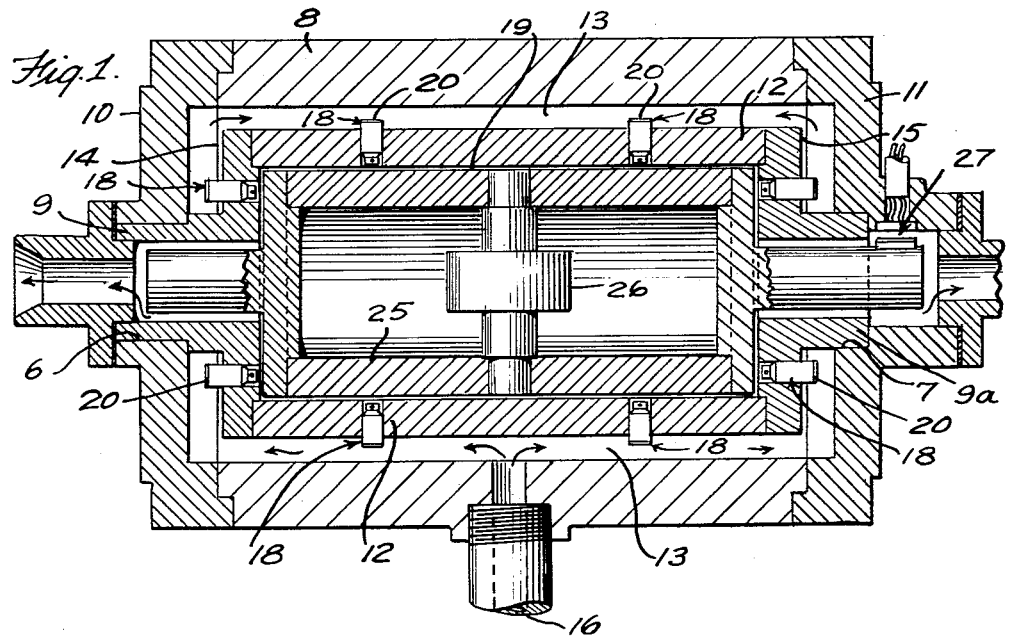
FIG. 1 is a vertical section of the air bearing unit in which plugs are incorporated.

Referring to FIG. 1, there is provided a cylindrical housing 8 which has end caps 10 and 11 fastened thereto. An air bearing sleeve 12 having end plates 14 and 15 is supported within the cylindrical housing 8 so as to form an air chamber 13 between the cylindrical housing and the air bearing sleeve. The end caps 10 and 11 are provided with holes 6 and 7 for receiving the bosses 9 and 9a which are connected to end plates 14 and 15 respectively. The housing 8 is provided with an inlet passage 16 for allowing air to pass into the air chamber 13 between the housing 8 and the bearing sleeve 12.

Within the air bearing sleeve 12 is a cylinder 25 which contains for instance a gyro wheel 26. The cylinder 25 has two shafts, one on either end thereof, one of the shafts being provided with a pickoff 27 for measuring the angular movement of the cylinder.

Figures 2, 3, 4:
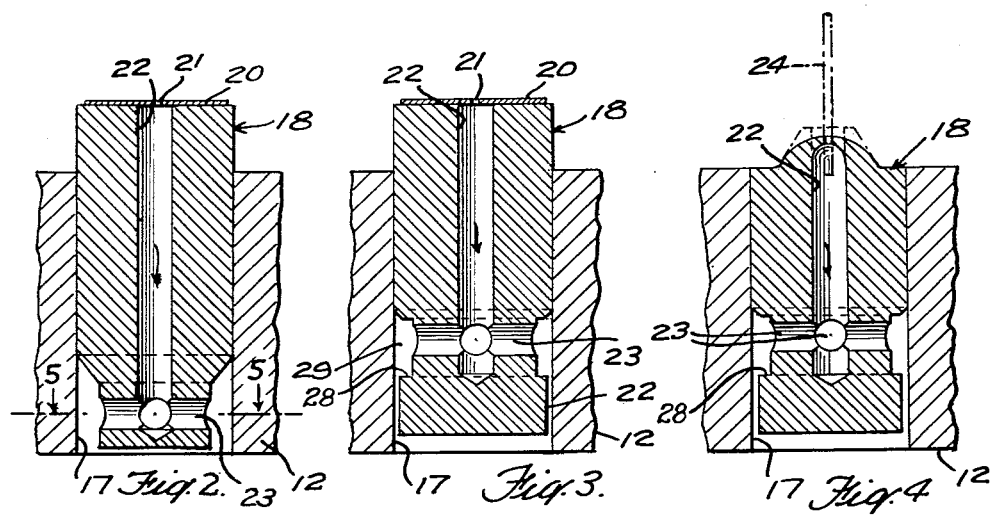
FIG. 2 is a detail view showing the air bearing plug in section.
FIG. 3 illustrates a modified air plug structure.
FIG. 4 illustrates still another modified air plug.
Figure 5:
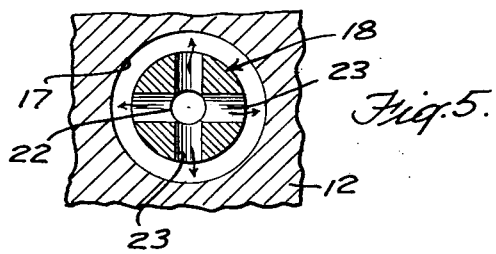
FIG. 5 is a detail in section of the crossed air passages in the plug taken on the line 5—5 of FIG. 2.

The air bearing sleeve 12 and the end plates 14 and 15 have holes 17 drilled therein. Within these holes there are removable plugs 18 as shown in FIG. 2. The plug 18 comprises a solid cylindrical body having a main air passage 22 therein. The air passage connects with crossed air passages 23 which are at right angles to each other and perpendicular to the main air passage. The crossed air passages 23 are located at an end of the plug 18 which is reduced in diameter so as to allow the air to flow between the plug 18 and the wall of the hole 17. To the other end of the plug a thin metallic foil 20 is secured so as to cover the main air passage 22. A hole 21 is pierced in the thin metallic foil which is substantially concentric with the main air passage 22. This pierced hole acts as an orifice to control the amount of air passing into the main air passage.

The modified plug shown in FIG. 3 is similar to that described above except that it has a shoulder 28 at the crossed air passage end. This shoulder is provided so that a ring like air chamber 29 is formed for the air to disperse in when coming out of the crossed air passages 23. The air in this air chamber 29 spills over the shoulder into air chamber 19.

In the modified plug shown in FIG. 4 the orifice 21 provided by the foil 20 in the above described plugs is eliminated. The orifice is formed instead by swaging over the air inlet end of the plug 18 so as to form a small hole defined by a wire 24 which is held concentrically with respect to the air passage 22 and removed after swaging. The unswaged and swaged position of the material at the orifice end of the plug are shown in dotted and full line positions respectively. The outlet end of the plug is the same as shown in FIG. 3 but can readily be made as shown in FIG. 2.

Referring to the device shown in FIG. 1 air is pumped or forced though the inlet passage 15 and fills the air chamber 13 between the cylindrical housing 8 and the air bearing sleeve 12. The air is then metered, by the orifices 21, into the main air passages 22 of the plugs 18. The air then passes to the crossed air passages 23 where it flows out around the narrowed portions of the plugs. The air in the air chamber 19 supports the rotative cylinder 25 without imparting any turbine torque to the cylinder.

The air from the air chamber 19 is recycled either to its originating point or passes to the atmosphere by means of the passageway between the shafts of the cylinder 25 and the holes in the bosses 9 and 9a.

Although we have described particular embodiments of the invention, it is understood that the present disclosure has been made by way of example and that numerous changes in the details of construction and the combination and arrangement of parts may be resorted to without departing from the spirit and the scope of the invention as hereinafter claimed.

What is claimed is:

1. An air bearing for supporting a rotative member comprising a sleeve, a rotative member disposed in said sleeve, a housing enclosing said sleeve and forming an air chamber therebetween, a plurality of plugs, means for retaining said plugs in said sleeve, said plugs having one end section of reduced diameter, a main air passage in each of said plugs extending through the other end thereof and an air disperser in said reduced end section of said plugs in communication with said main air passage and a means for controlling the flow of air into said main air passages in said plugs including a plurality of orifices each communicating in said other end of the plug with the main air passage and having a diameter substantially smaller than the diameter of the main air passage with which it is in communication and substantially shorter axially than the axial length of said air passage, a separate foil disposed at said other end of each plug, one of said orifices being formed in each foil concentric with the main air passage with which it is in communication.

2. An air bearing for supporting a rotative member comprising a sleeve, a rotative member disposed in said sleeve, a housing enclosing said sleeve and forming an air chamber therebetween, a plurality of plugs, means for retaining said plugs in said sleeve, said plugs having one end section of reduced diameter, a main air passage in each of said plugs extending through the other end thereof and an air disperser in said reduced end section of said plugs in communication with said main air passage and a means for controlling the flow of air into said main air passages in said plugs including a plurality of orifices each communicating in said other end of the plug with the main air passage and having a diameter substantially smaller than the diameter of the main air passage with which it is in communication and substantially shorter axially than the axial length of said air passage, said orifices being formed by swaging over the plug material about a thin wire held substantially concentric with the main air passages.

3. An air bearing for supporting a rotative member comprising a sleeve, a rotative member disposed in said sleeve, a housing enclosing said sleeve and forming an air chamber therebetween, a plurality of plugs, means for retaining said plugs in said sleeve, said plugs having one end section of reduced diameter forming a shoulder with a second section next to it, said second section being further reduced in diameter, a main air passage in each of said plugs extending through the other end thereof and an air disperser in said reduced end section of said plugs in communication with said main air passage and a means for controlling the flow of air into said main air passages in said plugs including a plurality of orifices each communicating in said other end of the plug with the main air passage and having a diameter substantially smaller than the diameter of the main air passage with which it is in communication and substantially shorter axially than the axial length of said air passage, a separate foil disposed at said other end of the plug, an orifice being formed in each foil concentric with the main air passage with which it is in communication.

4. An air bearing for supporting a rotative member comprising a sleeve, a rotative member disposed in said sleeve, a housing enclosing said sleeve and forming an air chamber therebetween, a plurality of plugs, means for retaining said plugs in said sleeve, said plugs having one end section of reduced diameter forming a shoulder with a second section next to it, said second section being further reduced in diameter, a main air passage in each of said plugs extending through the other end thereof and an air disperser in said reduced end section of said plugs in communication with said main air passage and a means for controlling the flow of air into said main air passages in said plugs including a plurality of orifices each communicating in said other end of the plug with the main air passage and having a diameter substantially smaller than the diameter of the main air passage with which it is in communication and substantially shorter axially than the axial length of said air passage, said orifices being formed by swaging over the plug material about a thin wire held substantially concentric with the main air passages.

References Cited in the file of this patent
UNITED STATES PATENTS
2,695,198    Brugger _____ Nov. 23, 1954
FOREIGN PATENTS
725,281    Great Britain _____ Mar. 2, 1955